(12) United States Patent
Jang et al.

(10) Patent No.: US 11,549,039 B2
(45) Date of Patent: Jan. 10, 2023

(54) PRESSURE SENSITIVE ADHESIVE COMPOSITION AND METHODS FOR ITS PREPARATION AND USE IN FLEXIBLE ORGANIC LIGHT EMITTING DIODE APPLICATIONS

(71) Applicant: Dow Silicones Corporation, Midland, MI (US)

(72) Inventors: Wonbum Jang, Jincheon-gun (KR); Kyung Dong Han, Cheungju (KR); Bo Kyung Bona Kim, Gwangmyeong (KR)

(73) Assignee: Dow Silicones Corporation, Midland, MI (US)

( * ) Notice: Subject to any disclaimer, the term of this patent is extended or adjusted under 35 U.S.C. 154(b) by 166 days.

(21) Appl. No.: 16/635,316

(22) PCT Filed: Oct. 17, 2018

(86) PCT No.: PCT/US2018/056175
§ 371 (c)(1),
(2) Date: Jan. 30, 2020

(87) PCT Pub. No.: WO2019/079366
PCT Pub. Date: Apr. 25, 2019

(65) Prior Publication Data
US 2020/0392384 A1 Dec. 17, 2020

Related U.S. Application Data

(60) Provisional application No. 62/574,344, filed on Oct. 19, 2017.

(51) Int. Cl.
*C09J 183/04* (2006.01)
*C09J 7/38* (2018.01)
*B32B 7/12* (2006.01)
*B32B 37/12* (2006.01)

(52) U.S. Cl.
CPC .............. *C09J 183/04* (2013.01); *B32B 7/12* (2013.01); *B32B 37/12* (2013.01); *C09J 7/38* (2018.01); *B32B 2457/206* (2013.01); *C09J 2203/318* (2013.01); *C09J 2483/00* (2013.01)

(58) Field of Classification Search
None
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,766,176 A | 8/1988 | Lee et al. |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,679,734 A | 10/1997 | Peccoux et al. |
| 6,545,086 B1 | 4/2003 | Kosal |
| 8,580,073 B2 | 11/2013 | Behl et al. |
| 8,840,993 B2 | 9/2014 | Yang et al. |
| 8,968,868 B2 | 3/2015 | Yang et al. |
| 9,540,551 B2 | 1/2017 | Okawa |
| 9,562,149 B2 | 2/2017 | Cray et al. |
| 9,593,209 B2 | 3/2017 | Dent et al. |
| 9,646,868 B2 | 5/2017 | Yasuda et al. |
| 10,351,742 B2 | 7/2019 | Brown et al. |
| 2003/0088042 A1 | 5/2003 | Griswold et al. |
| 2004/0122142 A1 | 6/2004 | Meguriya |
| 2004/0254274 A1 | 12/2004 | Griswold |
| 2005/0038188 A1 | 2/2005 | Ahn et al. |
| 2005/0113513 A1 | 5/2005 | Grisworld |
| 2008/0135175 A1 | 6/2008 | Higuchi |
| 2008/0254247 A1 | 10/2008 | Asaine |
| 2008/0254427 A1 | 10/2008 | Neviaser |
| 2009/0111931 A1 | 4/2009 | Pouchelon et al. |

(Continued)

FOREIGN PATENT DOCUMENTS

| | | | |
|---|---|---|---|
| CN | 101177595 | 5/2008 | |
| CN | 103151467 A * | 6/2013 | ........... G06T 3/0412 |

(Continued)

OTHER PUBLICATIONS

English Abstract JP-2014145019; Aug. 14, 2014; Nishio, 3 pages. (Year: 2014).*

English Abstract JP-11126037-A; May 11, 1999; 1 page, Honda. (Year: 1999).*

(Continued)

*Primary Examiner* — Linda L Gray

(74) *Attorney, Agent, or Firm* — Catherine U. Brown

(57) ABSTRACT

A pressure sensitive adhesive composition can cure via hydrosilylation to form a pressure sensitive adhesive. The pressure sensitive adhesive composition may be coated on a substrate and cured to form a protective film. The protective film is useful in flexible OLED device fabrication processes, e.g., for protection of passivation layers.

5 Claims, No Drawings

(56) References Cited

U.S. PATENT DOCUMENTS

| | | |
|---|---|---|
| 2012/0156457 A1 | 6/2012 | Kondo et al. |
| 2012/0328863 A1 | 12/2012 | Kuo |
| 2014/0306941 A1 | 10/2014 | Kim et al. |
| 2015/0337188 A1 | 11/2015 | Sakakibara et al. |
| 2016/0189998 A1 | 6/2016 | Yasuda et al. |
| 2016/0376482 A1 | 12/2016 | Morgeneyer et al. |
| 2017/0190939 A1 | 7/2017 | Hori et al. |
| 2017/0233612 A1 | 8/2017 | Han et al. |
| 2018/0037013 A1 | 2/2018 | Endo et al. |
| 2020/0071578 A1 | 3/2020 | Huo et al. |

FOREIGN PATENT DOCUMENTS

| | | |
|---|---|---|
| EP | 0347895 B | 12/1989 |
| EP | 0556023 | 8/1993 |
| EP | 2322584 B1 | 5/2011 |
| EP | 3038148 | 6/2016 |
| JP | 2014005354 | 1/2014 |
| JP | 2015074663 | 4/2015 |
| JP | 2015160922 | 9/2015 |
| KR | 1110534 | 1/2012 |
| KR | 2015021121 | 2/2015 |
| WO | 2012166870 | 12/2012 |
| WO | 2016138660 | 9/2016 |
| WO | 2016139956 | 9/2016 |
| WO | 2017065131 | 4/2017 |
| WO | 2017106087 | 6/2017 |

OTHER PUBLICATIONS

Office Action Report letter from corresponding Japanese Application No. 2020-504715 dated Oct. 13, 2022.
Chinese Office Action regarding Application No. 201880050576.5, dated Sep. 27, 2021, 1 page.

* cited by examiner

PRESSURE SENSITIVE ADHESIVE COMPOSITION AND METHODS FOR ITS PREPARATION AND USE IN FLEXIBLE ORGANIC LIGHT EMITTING DIODE APPLICATIONS

CROSS REFERENCE TO RELATED APPLICATIONS

This application is a U.S. national stage filing under 35 U.S.C. § 371 of PCT Application No. PCT/US2018/056175 filed on Oct. 17, 2018, currently pending, which claims the benefit of U.S. Provisional Patent Application No. 62/574,344 filed Oct. 19, 2017 under 35 U.S.C. § 119 (e). PCT Application No. PCT/US2018/056175 and U.S. Provisional Patent Application No. 62/574,344 are hereby incorporated by reference.

TECHNICAL FIELD

This invention relates to a pressure sensitive adhesive composition that is useful in processes for fabricating flexible organic light emitting diode (OLED) displays. The pressure sensitive adhesive composition cures to form a pressure sensitive adhesive with low initial adhesion, high adhesion stability over time, and low migration.

BACKGROUND

In a typical process for fabricating a flexible OLED display, an OLED is formed on a relatively rigid substrate (e.g., glass or glass coated with a polyimide varnish), and a passivation layer is formed on the surface of the OLED opposite the substrate. During further processing, the rigid substrate is removed. Weak or brittle layers need to be protected from damage (e.g., scratches or other shocks) during the further processing.

To protect the layers during the fabrication process, a protective film with low adhesion is desired to prevent delamination of a layer (e.g., passivation layer) on a surface of an OLED module during releasing of the protective film after use. If adhesion control fails and adhesion increase with time (i.e., during the fabricating process), the layer may delaminate or be damaged when the protective film is removed. Therefore, there is an industry need to provide protective films with low adhesion and high adhesion stability (where adhesion does not increase during the time needed for the fabrication process to an extent that would cause delamination or damage).

It is also important that the surface of the layer remain clean such that additional films or layers can be laminated thereto after removal of the protective film. Therefore, there is an industry need to provide a protective film with low migration (such that no or minimal amounts of adhesive from the protective film remain on the surface of the layer in the flexible OLED device after the protective film is removed.

BRIEF SUMMARY OF THE INVENTION

A pressure sensitive adhesive composition comprises:
A) 85 to 100 parts by weight of an alkenyl containing polydialkylsiloxane, where the alkenyl containing polydialkylsiloxane has silicon bonded alkyl groups with 1 to 10 carbon atoms and silicon bonded alkenyl groups with 2 to 6 carbon atoms, and where the alkenyl groups are present in an amount >0.3% based on the weight of the alkenyl containing polydialkylsiloxane;
C) 0.1 to 5 parts by weight of a polyalkylhydrogensiloxane having silicon bonded alkyl groups with 1 to 10 carbon atoms and having, per molecule, an average of at least 1% silicon bonded hydrogen atoms;
E) 0.01 to 0.5 part by weight of an acetylenic alcohol;
F) an amount of a platinum group metal catalyst sufficient to provide 10 to 5000 ppm concentration of platinum group metal in the composition, and
G) 10% to 90% based on the weight of all starting materials in the composition of an organic solvent; with the proviso that all starting materials in the composition combined have a molar ratio of silicon bonded hydrogen atoms to silicon bonded alkenyl groups (SiH/Vi ratio) of 0.5 to 2.

DETAILED DESCRIPTION OF THE INVENTION

The pressure sensitive adhesive composition may comprise the following starting materials:
A) 85 to 100 parts by weight of an alkenyl containing polydialkylsiloxane, where the alkenyl containing polydialkylsiloxane has silicon bonded alkyl groups with 1 to 10 carbon atoms and silicon bonded alkenyl groups with 2 to 6 carbon atoms, and where the alkenyl groups are present in an amount >0.3% based on the weight of the alkenyl containing polydialkylsiloxane;
B) 0 to 15 parts by weight of a polyorganosiloxane resin comprising units of formula $(R^1_2R^2SiO_{1/2})_a(R^1_3SiO_{1/2})_b (SiO_{4/2})_c$, where each $R^1$ is independently an alkyl group of 1 to 10 carbon atoms; each $R^2$ is independently selected from $R^1$, OH, and alkenyl groups of 2 to 6 carbon atoms; subscript a≥0, subscript b≥0, subscript c>0, a quantity (a+b)>0, and subscripts a, b, and c have values such that 0.9≤(a+b)/c≤1.3;
C) 0.1 to 5 parts by weight of a polyalkylhydrogensiloxane having silicon bonded alkyl groups with 1 to 10 carbon atoms and having, per molecule, an average of at least 1% silicon bonded hydrogen atoms;
D) 0 to 5.0 part by weight of an adhesion promoter;
E) 0.01 to 0.5 part by weight of an acetylenic alcohol;
F) an amount of a platinum group metal catalyst sufficient to provide 10 to 5000 ppm concentration of platinum group metal in the composition, and
G) 10% to 90% based on the weight of all starting materials in the composition of an organic solvent; with the proviso that all starting materials in the composition combined have an SiH/Vi ratio of 0.5 to 2.

Starting material A) in the pressure sensitive adhesive composition is an alkenyl-containing polydialkylsiloxane, where the alkenyl-containing polydialkylsiloxane has silicon bonded alkyl groups with 1 to 10 carbon atoms and silicon bonded alkenyl groups with 2 to 6 carbon atoms, and where the alkenyl groups are present in an amount >0.3% based on the weight of the alkenyl-containing polydialkylsiloxane. Alternatively, starting material A) may contain >0.30% to 0.80% alkenyl groups; alternatively 0.35% to 0.80%; alternatively 0.40% to 0.78%, and alternatively 0.405% to 0.78% alkenyl groups. Without wishing to be bound by theory, it is thought that if the alkenyl-containing polydialkylsiloxane contains less than 0.3% alkenyl groups, the pressure sensitive adhesive prepared from the composition may increase with time and cause damage to the passivation layer when the pressure sensitive adhesive film is removed. And, it is thought that if the alkenyl-containing polydialkylsiloxane is too high (e.g., >0.8%), a pressure sensitive adhesive prepared from the composition may lose adhesiveness over time. Starting material A) may be free of silicon bonded aromatic hydrocarbyl groups. "Free of" in this context means that starting material A) contains no aromatic hydrocarbyl groups (such as phenyl, tolyl, xylyl or benzyl) or an amount of aromatic hydrocarbyl groups that is non-detectable by digestive gas chromatography mass spectrometry (GCMS) analysis.

Starting material A) may comprise a polydialkylsiloxane of unit formula (I): $(R^1{}_2R^2SiO_{1/2})_d(R^1{}_3SiO_{1/2})_e(R^1R^2SiO_{2/2})_f(R^1{}_2SiO_{2/2})_g$, where subscript d≥0, subscript e≥0, subscript f>0, subscript g≥0, where a quantity (d+e) has an average value of 2. Alternatively, subscripts d, e, f, and g, have values such that 2≥d≥0, 2≥e≥0, 70≥f≥0, 10,000≥g≥0. Alternatively, subscript f may have a value such that 50≥f≥0. Alternatively, subscript g may have a value such that 9,500≥g≥0. The alkenyl-containing polydialkylsiloxane contains >0.30% alkenyl groups based on the weight of the alkenyl-containing polydialkylsiloxane, and the values of subscripts d and f combined are sufficient to provide the alkenyl content of starting material A).

In unit formula (I), each $R^1$ is independently an alkyl group of 1 to 10 carbon atoms and each $R^2$ is independently an alkenyl group of 2 to 6 carbon atoms. Suitable alkyl groups include branched or unbranched, saturated monovalent hydrocarbon groups. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 to 10 carbon atoms. Alternatively, each $R^1$ may be selected from methyl, ethyl, and iso-propyl. Alternatively, each $R^1$ may be methyl. Suitable alkenyl groups include branched or unbranched monovalent hydrocarbon groups having a terminal double bond. Alkenyl is exemplified by, but not limited to, vinyl, allyl, butenyl (e.g., isobutenyl, n-butenyl, tert-butenyl and/or sec-butenyl), and hexenyl, including branched and linear groups of 6 carbon atoms. Alternatively, each $R^2$ may be vinyl, allyl, or hexenyl. Alternatively, each $R^2$ may be vinyl or hexenyl.

Starting material A) is exemplified by
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylhexenylsiloxy-terminated polydimethylsiloxane,
viii) dimethylhexenylsiloxy-terminated poly(dimethylsiloxane/methylhexenylsiloxane),
ix) dimethylhexenylsiloxy-terminated polymethylhexenylsiloxane,
x) trimethylsiloxy-terminated poly(dimethylsiloxane/methylhexenylsiloxane),
xi) trimethylsiloxy-terminated polymethylhexenylsiloxane,
xii) dimethylhexenyl-siloxy terminated poly(dimethylsiloxane/methylhexenylsiloxane),
xiii) dimethylvinylsiloxy-terminated poly(dimethylsiloxane/methylhexenylsiloxane),
xiv) a combination of two or more of i), ii), iii), iv), v), vi), vii), viii), ix), x), xi), xii), and xiii).

Methods of preparing alkenyl-containing polydialkylsiloxanes suitable for use as starting material A) such as hydrolysis and condensation of the corresponding organohalosilanes or equilibration of cyclic polydiorganosiloxanes, are well known in the art.

The pressure sensitive adhesive composition may optionally further comprise starting material B) a polyalkylsiloxane resin. The polyalkylsiloxane resin is an MQ resin consisting essentially of $R^3{}_3SiO_{1/2}$ units and $SiO_{4/2}$ units, where each $R^3$ is independently selected from a hydroxyl group, an alkyl group of 1 to 10 carbon atoms, and an alkenyl group of 2 to 6 carbon atoms, where suitable alkyl groups and alkenyl groups are as described above for $R^1$ and $R^2$, respectively. Starting material B) may be free of silicon bonded aromatic hydrocarbyl groups.

Alternatively, the polyalkylsiloxane resin may comprise unit formula (II): $(R^1{}_2R^3SiO_{1/2})_a(R^1{}_3SiO_{1/2})_b(SiO_{4/2})_3$, where $R^1$ and $R^3$ are as described above, subscript a≥0, subscript b≥0, subscript c>0, a quantity (a+b)>0, and subscripts a, b, and c have values such that 0.9≤(a+b)/c≤1.3.

The resin may contain an average of 3 to 30 mole percent of alkenyl groups, alternatively 0.1 to 30 mole percent, alternatively 0.1 to 5 mole percent, alternatively 3 to 100 mole percent. The mole percent of alkenyl groups in the resin is the ratio of the number of moles of alkenyl group-containing siloxane units in the resin to the total number of moles of siloxane units in the resin, multiplied by 100.

Methods of preparing resins are well known in the art. For example, resin may be prepared by treating a resin copolymer produced by the silica hydrosol capping process of Daudt, et al. with at least an alkenyl-containing endblocking reagent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The resin, which typically contains less than 2% of silicon-bonded hydroxyl groups, may be prepared by reacting the product of Daudt, et al. with an alkenyl group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

The amount of starting material B) in the pressure sensitive adhesive composition depends on various factors including the desired form of the reaction product of the composition, the quantity and hydrosilylation reactivity of the alkenyl groups of starting material A), the type and amount of catalyst, and the content of silicon bonded hydrogen atoms of starting material C). However, the amount of starting material B) may range from 0 to 15 parts by weight, per 100 parts by weight of starting material A); alternatively >0 to 15 parts by weight on the same basis.

The pressure sensitive adhesive composition further comprises starting material C) a polyalkylhydrogensiloxane. Polyalkylhydrogensiloxanes may comprise siloxane units including, but not limited to, $HR^1{}_2SiO_{1/2}$, $R^1{}_3SiO_{1/2}$, $HR^1SiO_{2/2}$, $R^1{}_2SiO_{2/2}$, $R^1SiO_{3/2}$, $HSiO_{3/2}$ and $SiO_{4/2}$ units.

The polyalkylhydrogensiloxane may be linear. In the preceding formulae, each $R^1$ is independently selected from the alkyl groups described above. Starting material C) may be free of silicon bonded aromatic hydrocarbyl groups. Starting material C) may comprise a polyalkylhydrogensiloxane of formula (III), formula (IV) or a combination thereof, where: Formula (III) is $R^1{}_3SiO(R^1{}_2SiO)_g(R^1HSiO)_hSiR^1{}_3$, and Formula (IV) is $R^1{}_2HSiO(R^1{}_2SiO)_i(R^1HSiO)_jSiR^1{}_2H$.

In formulae (III) and (IV) above, subscript g has an average value ranging from 0 to 2000, subscript h has an average value ranging from 2 to 2000, subscript i has an average value ranging from 0 to 2000, and subscript j has an average value ranging from 0 to 2000. Each $R^1$ is independently an alkyl group of 1 to 10 carbon atoms, as described above.

Polyalkylhydrogensiloxanes for starting material C) are exemplified by:
a) dimethylhydrogensiloxy-terminated polydimethylsiloxane,
b) dimethylhydrogensiloxy-terminated poly(dimethylsiloxane/methylhydrogensiloxane),
c) dimethylhydrogensiloxy-terminated polymethylhydrogensiloxane,
d) trimethylsiloxy-terminated poly(dimethylsiloxane/methylhydrogensiloxane),
e) trimethylsiloxy-terminated polymethylhydrogensiloxane, and
f) a combination of two or more of a), b), c), d), and e).

Methods of preparing linear, branched, and cyclic polyalkylhydrogensiloxanes suitable for use as starting material C), such as hydrolysis and condensation of alkylhalosilanes, are well known in the art.

The exact amount of starting material C) in the composition depends on various factors including reactivity of starting material A), whether starting material B) is present, and the type and amount of any additional starting materials (e.g., starting material D)), if present. However, the amount of starting material C) in the pressure sensitive adhesive composition may be 0.1% to 5%, alternatively 0.5% to 2% based on combined weights of all starting materials in the composition.

The alkenyl content of starting material A) and any other starting materials in the composition that contain silicon bonded alkenyl groups (e.g., starting material B) and starting material C), when alkenyl functional) and the SiH content of starting material B) and any other SiH containing materials in the pressure sensitive adhesive composition (e.g., starting material D) the adhesion promoter, when SiH functional) are sufficient to provide the pressure sensitive composition with a molar ratio of silicon bonded hydrogen atoms to silicon bonded alkenyl groups (SiH/Vi) ratio of at least 0.5, alternatively up to 2, alternatively, at least 1, alternatively 1 to 2, alternatively >1 to 2, and alternatively >1 to 1.2.

The pressure sensitive adhesive composition may optionally further comprise an adhesion promoter. Suitable adhesion promoters may comprise a hydrocarbonoxysilane such as an alkoxysilane, an epoxy-functional silane, an epoxy-functional siloxane, a siloxane having both alkoxy and epoxy functional groups, or a combination thereof. Adhesion promoters are known in the art and may comprise silanes having the formula $R^{19}{}_rR^{20}{}_sSi(OR^{21})_{4-(r+s)}$ where each $R^{19}$ is independently a monovalent hydrocarbon group having at least 3 carbon atoms; $R^{20}$ contains at least one SiC bonded substituent having an adhesion-promoting group, such as amino- or epoxy-functional groups; subscript r has a value ranging from 0 to 2; subscript s is either 1 or 2; and the sum of (r+s) is not greater than 3. Each $R^{21}$ is independently a saturated hydrocarbon group. Saturated hydrocarbon groups for $R^{21}$ may be, for example, an alkyl group of 1 to 4 carbon atoms, alternatively 1 to 2 carbon atoms. $R^{21}$ is exemplified by methyl, ethyl, propyl, and butyl. Alternatively, the adhesion promoter may comprise a partial condensate of the above silane. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{22}{}_tSi(OR^{23})_{(4-t)}$, where subscript t is 1, 2, or 3, alternatively subscript t is 1. Each $R^{22}$ is independently a monovalent organic group with the proviso that at least one $R^{22}$ is an epoxy-functional organic group. Epoxy-functional organic groups for $R^{22}$ are exemplified by 3-glycidoxypropyl and (epoxycyclohexyl)ethyl. Each $R^{23}$ is independently a saturated hydrocarbon group of 1 to 4 carbon atoms, alternatively 1 to 2 carbon atoms. $R^{23}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

The exact amount of adhesion promoter added to the pressure sensitive adhesive composition depends on various factors including the selection of the other starting materials and the selection of substrate onto which the pressure sensitive adhesive composition will be applied. However, when present, the amount of adhesion promoter may be 0.1 to 5.0 parts by weight. The adhesion promoter may be free of silicon bonded aromatic hydrocarbyl groups.

The pressure sensitive adhesive composition further comprises starting material E) an acetylenic alcohol. The acetylenic alcohol may be added as an inhibitor or stabilizer for the pressure sensitive adhesive composition. Suitable acetylenic alcohols are exemplified by methyl butynol, ethynyl cyclohexanol (ETCH), dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-diemthyl-1-hexyn-3-ol, and 1-ethynyl-1-cyclohexanol, and a combination thereof. Alternatively, starting material E) is exemplified by is exemplified by ETCH.

The amount of acetylenic alcohol added to the composition will depend on various factors including the desired pot life of the pressure sensitive adhesive composition, whether the composition will be a one part composition or a multiple part composition, the particular acetylenic alcohol used, and the selection and amount of starting material C). However, when present, the amount of starting material C) may range from 0.01 to 0.5 parts by weight.

The pressure sensitive adhesive composition further comprises starting material F) a hydrosilylation reaction catalyst. Suitable hydrosilylation reaction catalysts are known in the art and are commercially available. The hydrosilylation catalysts can be a platinum group metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654.

The hydrosilylation reaction catalyst is added to the pressure sensitive adhesive composition in an amount sufficient to catalyze hydrosilylation reaction, typically an amount sufficient to provide 10 ppm to 5,000 ppm by weight of platinum group metal.

The pressure sensitive adhesive composition further comprises a solvent. The solvent can be an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

The amount of solvent will depend on various factors including the type of solvent selected and the amount and type of other starting materials selected for the pressure sensitive adhesive composition. However, the amount of solvent may range from 10% to 90%, alternatively 20% to 60%, based on combined weights of all starting materials in the pressure sensitive adhesive composition. The solvent can be added during preparation of the pressure sensitive adhesive composition, for example, to aid mixing and delivery. All or a portion of the solvent may be added with one of the other starting materials. For example, starting material A), and when present starting material B), may be dissolved in a solvent, such as an aromatic hydrocarbon, before combination with the other starting materials in the composition. All or a portion of the solvent may optionally be removed after the pressure sensitive adhesive composition is prepared.

When selecting starting materials for the pressure sensitive adhesive composition described above, there may be overlap between types of starting materials because certain starting materials described herein may have more than one function. For example, certain alkoxysilanes may be useful as filler treating agents and as adhesion promoters. Certain particulates may be useful as fillers and as pigments, and even as flame retardants, e.g., carbon black. When adding additional starting materials to the composition, the additional starting materials are distinct from one another and from the required starting materials in the composition.

The pressure sensitive adhesive composition can be prepared by a method comprising combining all starting materials by any convenient means such as mixing at ambient or elevated temperature. Starting material E) the acetylenic alcohol may be added before starting material F) the platinum group metal catalyst, for example, when the pressure sensitive adhesive composition will be prepared at elevated temperature and/or the composition will be prepared as a one part composition.

Alternatively, the pressure sensitive composition may be prepared as a multiple part composition, for example, when the composition will be stored for a long period of time before use. In the multiple part composition, starting material F) the platinum group metal catalyst is stored in a separate part from any starting material having a silicon bonded hydrogen atom, for example starting material C) the polyalkylhydrogensiloxane, and the parts are combined shortly before use of the pressure sensitive adhesive composition. For example, a two part composition may be prepared by combining starting materials comprising A) the alkenyl-containing polydialkylsiloxane, C) the polyalkylhydrogensiloxane and G) the organic solvent, and optionally one or more other additional starting materials described above to form a base part, by any convenient means such as mixing. A curing agent may be prepared by combining starting materials comprising A) the alkenyl-containing polydialkylsiloxane, F) the platinum group metal catalyst and G) the organic solvent, and optionally one or more other additional starting materials described above by any convenient means such as mixing. The starting materials may be combined at ambient or elevated temperature. Starting material E) the acetylenic alcohol may be included in one or more of the base part, the curing agent part, or a separate additional part. Starting material D) adhesion promoter, when used, may be added to the base part, or may be added as a separate additional part. Starting material B) the polyalkylsiloxane resin, when used, may be added to the base part, the curing agent part, or a separate additional part. When a two part composition is used, the weight ratio of amounts of base part to curing agent part may range from 1:1 to 10:1. The pressure sensitive adhesive composition will cure via hydrosilylation reaction to form a pressure sensitive adhesive.

The method described above may further comprise one or more additional steps. The pressure sensitive adhesive composition prepared as described above may be used to form an adhesive article, e.g., a pressure sensitive adhesive (prepared by curing the pressure sensitive adhesive composition described above) on a substrate. The method described above may, therefore, further comprise comprises applying the pressure sensitive adhesive composition to a substrate.

Applying the pressure sensitive adhesive curable composition to the substrate can be performed by any convenient means. For example, the pressure sensitive adhesive curable composition may be applied onto a substrate by gravure coater, offset coater, offset-gravure coater, roller coater, reverse-roller coater, air-knife coater, or curtain coater.

The substrate can be any material that can withstand the curing conditions (described below) used to cure the pressure sensitive adhesive curable composition to form the pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), or polyethylene terephthalate (PET), or PE (polyethylene), or PP (polypropylene). Alternatively, the substrate may be a metal foil such as aluminum foil or copper foil. The thickness of the substrate is not critical, however, the thickness may range from 5 micrometers to 300 micrometers.

To improve bonding of the pressure sensitive adhesive to the substrate, the method may optionally further comprise treating the substrate before applying the pressure sensitive adhesive composition. Treating the substrate may be performed by any convenient means, such as applying a primer, or subjecting the substrate to corona-discharge treatment, etching, or plasma treatment before applying the pressure sensitive adhesive composition to the substrate.

An adhesive article such as a protective film may be prepared by applying the pressure sensitive adhesive composition described above onto the substrate described above. The method may optionally further comprise removing the all, or a portion, of the solvent before and/or during curing. Removing solvent may be performed by any convenient means, such as heating at a temperature that vaporizes the solvent without fully curing the pressure sensitive adhesive composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes). The method then further comprises curing the pressure sensitive adhesive composition (which may have some or all of the solvent removed when the drying step is performed) room temperature or by heating at a temperature of 140° C. to 220° C., alternatively 150° C. to 220° C., alternatively 160° C. to 200° C., and alternatively 165° C. to 180° C. for a time sufficient to cure the pressure sensitive adhesive curable composition (e.g., for 30 seconds to an hour, alternatively 1 to 5 minutes). This forms a pressure sensitive adhesive on the substrate. Drying and/or curing may be performed by placing the substrate in an oven. The amount of the pressure sensitive adhesive composition to be applied to the substrate depends on the specific application, however, the amount may be sufficient such that after curing thickness of the pressure sensitive adhesive may be 5 micrometers to 200 micrometers, and for protective film the thickness may be 10 micrometers to 50 micrometers, alternatively 20 micrometers to 40 micrometers, and alternatively 30 micrometers.

The method described herein may optionally further comprise applying a removable release liner to the pressure sensitive adhesive opposite the substrate, e.g., to protect the pressure sensitive adhesive before use of the adhesive article.

The adhesive article (e.g., protective film) prepared as described above is suitable for use in flexible OLED device fabrication processes as a protective film with low adhesion, high adhesion stability, and/or low migration.

For example, a method for fabricating a flexible OLED device may include forming an OLED module on a surface of a substrate, e.g., a passivation layer on a surface of the OLED module opposite the substrate, and applying a protective film prepared as described herein to a surface of the passivation layer opposite the OLED module.

EXAMPLES

These examples are intended to illustrate some embodiments of the invention and should not be interpreted as limiting the scope of the invention set forth in the claims. Starting materials used in these examples are described in Table 0.

TABLE 0

Starting Materials Used in the Examples

| Starting Material | Chemical Description | Vinyl Content (wt %) | SiH Content (wt %) |
|---|---|---|---|
| A1 | A mixture of 25% vinyl-terminated polydimethylsiloxane with DP = 9,461; and 75% toluene | 0.012 | None |
| A2 | A mixture of 25% vinyl-containing poly(dimethyl/methylvinyl)siloxane having both pendant and terminal vinyl groups and DP = 9,462; and 75% toluene | 0.065 | None |
| A3 | A mixture of 25% vinyl-containing poly(dimethyl/methylvinyl)siloxane having both pendant and terminal vinyl groups and DP = 9,436; and 75% toluene | 0.22 | None |
| A4 | A mixture of 25% vinyl-containing poly(dimethyl/methylvinyl)siloxane having both pendant and terminal vinyl groups and DP = 9,437; and 75% toluene | 0.41 | None |
| A5 | A mixture of 25% hexenyl-containing poly(dimethyl/methylhexenyl)siloxane having pendant hexenyl groups and DP = 9,333; and 75% toluene | 0.45 | None |
| A6 | A mixture of 25% hexenyl-containing poly(dimethyl/methylhexenyl)siloxane with DP = 6,800; and 75% toluene | 0.78 | None |
| A7 | Vinyl-terminated polydimethylsiloxane with DP = 830 | 0.087 | None |
| A8 | Vinyl-terminated polydimethylsiloxane with DP = 700 | 0.14 | None |
| A9 | Vinyl-terminated polydimethylsiloxane with DP = 434 | 0.24 | None |
| A10 | Vinyl-terminated polydimethylsiloxane with DP = 149 | 0.42 | None |
| B1 | Methyl capped polymethylsiloxane resin with $Me_3SiO_{1/2}$ and $SiO_{4/2}$ units having a weight average molecular weight (Mw) = 15,000 and containing <1% silanol | 0 | None |
| B2 | Vinyl capped polymethylsiloxane resin with $Me_3SiO_{1/2}$ $Me_2ViSiO_{1/2}$ and $SiO_{4/2}$ units having Mw = 20,000 and containing 2% silanol | 1.9 | None |
| B3 | Uncapped polymethylsiloxane resin with $Me_3SiO_{1/2}$ and $SiO_{4/2}$ units having Mw = 17,000 and containing 2% silanol | None | None |
| C1 | Trimethylsiloxy-terminated polymethylhydrogensiloxane homopolymer with DP = 37 | None | 1.6 |
| C2 | Trimethylsiloxy-terminated poly(dimethyl/methylhydrogen)siloxane copolymer with DP = 57 | None | 1.1 |
| E1 | Ethynyl cyclohexanol from BASF | N/A | N/A |
| F1 | Platinum divinylsiloxane complex (Karstadt's catalyst), vinyl containing siloxane complexed platinum solution (0.5 wt % concentration of Pt) | Not tested | N/A |
| G1 | Toluene | N/A | N/A |

In the table above, 'N/A' means not applicable; 'Me' means methyl; and 'Vi' means vinyl.

Example 1

Preparation of Pressure Sensitive Adhesive Composition Samples P1 to P10

Pressure sensitive adhesive composition samples were prepared by combining the starting materials shown in Table 0. A polyalkylhydrogensiloxane (C1) was added to an alkenyl-containing polydimethylsiloxane (one of A1 to A10) in amounts shown below in Table 2. The amount of polyalkylhydrogensiloxane (C1) was sufficient to make the SiH/Vi molar ratio in the mixture 0.5. This ratio included vinyl present in the vinyl containing siloxane complexed platinum catalyst (E1), which was added at the end of this procedure. An inhibitor (E1) was added in an amount of 0.15 weight part, and the resulting combination was mixed well. After homogenizing the mixture, vinyl containing siloxane complexed platinum solution with a 0.5 wt % concentration of Pt (F1) was added to the mixture in an amount sufficient to make 75 ppm of Pt metal concentration in the mixture. The mixture was immediately mixed again carefully not to generate heat. The resulting pressure sensitive adhesive composition sample was then ready for use. The amount of each starting material in samples P1 to P10 and the SiH/Vi ratio is shown in Table 1.

Example 2

Preparation of Pressure Sensitive Adhesive Composition Samples P11 to P20

Samples were prepared in the same way as Example 1, except the amount of polyalkylhydrogensiloxane (C1) was adjusted to make the SiH/Vi molar ratio 1.0. The amount of each starting material in samples P11 to P20 and the SiH/Vi ratio is shown in Table 2.

Example 3

Preparation of Pressure Sensitive Adhesive Composition Samples P21 to P30

Samples were prepared in the same way as Example 1, except the amount of polyalkylhydrogensiloxane (C1) was adjusted to make the SiH/Vi molar ratio 1.5. The amount of each starting material in samples P21 to P30 and the SiH/Vi ratio is shown in Table 3.

Example 4

Preparation of Pressure Sensitive Adhesive Composition Samples P31 to P40

Samples were prepared in the same way as Example 1, except the amount of polyalkylhydrogensiloxane (C1) was adjusted to make the SiH/Vi molar ratio 2.0. The amount of each starting material in samples P31 to P40 is shown in Table 4.

Example 6

Preparation of Pressure Sensitive Adhesive Composition Samples P51 to P60

Samples were prepared in the same way as Example 5, except the amount of polyalkylhydrogensiloxane (C2) was adjusted to make the SiH/Vi molar ratio 1.0. The amount of each starting material in samples P51 to P60 is shown in Table 6.

Example 7

Preparation of Pressure Sensitive Adhesive Composition Samples P61 to P70

Samples were prepared in the same way as Example 5, except the amount of polyalkylhydrogensiloxane (C2) was adjusted to make the SiH/Vi molar ratio 1.5. The amount of each starting material in samples P61 to P70 is shown in Table 7.

Example 8

Preparation of Pressure Sensitive Adhesive Composition Samples P71 to P80

Samples were prepared in the same way as Example 5, except the amount of polyalkylhydrogensiloxane (C2) was adjusted to make the SiH/Vi molar ratio 2.0. The amount of each starting material in samples P71 to P80 is shown in Table 8.

Example 9

Samples of Pressure Sensitive Adhesive Compositions Containing Blends of Different Alkenyl Containing Polydialkylsiloxanes (Samples P81 to P88)

A 50:50 wt % mixture of alkenyl containing polydialkylsiloxane which contained 0.406 vinyl wt % (A4) or 0.2346 wt % (A9) each prepared as a 25% solution in toluene were mixed and blended together. Samples P81 to P88 were prepared according to the procedure as described above for Example 1 but using the starting materials and amounts shown in Table 9.

Example 10

Preparation of Pressure Sensitive Adhesive Composition Samples Containing Resins (Samples A01 to A18)

To a 25% solution of alkenyl-containing polydialkylsiloxane (A4 or A6), a polyorganosiloxane resin (B1, B2, or B3), a polyorganohydrogensiloxane (C1), and an inhibitor (G1) were added and mixed well. To the resulting homogeneous mixture, a hydrosilylation catalyst (F1) was added and mixed again carefully not to generate heat. The amount of each starting material in samples A01 to A18 is shown in Table 10. The resulting pressure sensitive adhesive composition samples were each ready for use within 1 hr.

Example 11

Si PSA Coating and Cure

Each pressure sensitive adhesive composition sample described above (P01 to P88, A01 to A18) was applied onto a 50 um PET film, which was urethane primed. The primed PET film was commercially available from Toray Advanced Material Korea (AMK). A pressure-sensitive adhesive layer which after curing has a thickness of 30 um was formed on the PET film. A pressure-sensitive adhesive sheet was produced by heating the coated film for 2 minutes at 150° C.

Example 12

Initial Adhesion Measurement

Initial adhesion was measured on the pressure sensitive adhesive layer prepared from the pressure sensitive adhesive composition samples described above by measuring adhesion strength to a stainless steel plate (SUS304) measured according to a 180-degree peel test, as follows: Pressure sensitive adhesive tapes were formed by cutting the sheets obtained in Example 11 into 1 inch-wide strips. Each tape was peeled from the peelable polyethylene terephthalate films and adhered under pressure of 2 kgf developed by rubber rollers to an adherend in the form of a mirror-surface stainless steel plate (SUS304).

Example 13

Adhesion Measurement for Aged Condition at 85° C./85%

Aged adhesion was measured on an adhesive layer prepared from the pressure sensitive adhesive composition samples, as follows: Initial adhesion force to a stainless steel plate (SUS304) was measured according to the 180-degree peel test specified in Example 12. Pressure sensitive adhesive tapes were formed by cutting the sheets into 1 inch-wide strips. Each tape was peeled from the peelable polyethylene terephthalate films and adhered under pressure of 2 kgf developed by rubber rollers to an adherend in the form of a mirror-surface stainless steel plate (SUS304). These samples were aged for 1 day (24 hr) and 3 days (72 hr) in an oven at 85° C./85% moisture. After cooling the samples to room temperature, the adhesion force was measured by pulling the pressure-sensitive adhesive tape off from the adherend at an angle of 180° relative to the surface of the adherend with the use of a tensile tester at a constant speed of 12 inch/min. The test equipment was AR-1000 (Cheminstrument Company. Adhesion increase rate was calculated with the equation below.

Adhesion increase rate=(Adhesion force after 3 day at 85° C./85%)/(Initial adhesion force)

Example 14

Residual Adhesive-Remaining Property and Silicone-Transfer Property after Exposure to 85° C./85% Condition Pressure sensitive adhesive tapes were formed by cutting sheets prepared according to Example 11 into 1 inch-wide strips. Each tape was peeled from the peelable polyethylene terephthalate films and adhered under pressure of 2 kgf developed by rubber rollers to an adherend in the form of a mirror-surface stainless steel plate (SUS304). The samples were aged for 24 hr (1 day) and 72 hr (3 days) in an oven at 85° C./85% relative humidity. After cooling the samples to room temperature, the resulting tapes were removed from a mirror-surface stainless steel plate. Adhere Nitto 31B by 2 KG roller on the place that tape removed. After 30 minutes, the adhesion force was measured by pulling the pressure-sensitive adhesive tape off from the adherend at an angle of 180° relative to the surface of the adherend with the use of a tensile tester at a constant speed of 12 inch/min.

TABLE 1

Compositions of Samples P1 to P10

| Starting Material/Sample Number | P1 | P2 | P3 | P4 | P5 | P6 | P7 | P8 | P9 | P10 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C1 | 0.049 | 0.110 | 0.288 | 0.505 | 0.556 | 0.938 | 0.136 | 0.195 | 0.310 | 0.520 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 0.50 | 0.50 | 0.50 | 0.50 | 0.50 | 0.50 | 0.50 | 0.50 | 0.50 | 0.50 |

TABLE 2

Compositions of Samples P11 to 20

| Starting Material/Sample Number | P11 | P12 | P113 | P14 | P15 | P16 | P17 | P18 | P19 | P20 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |

TABLE 2-continued

Compositions of Samples P11 to 20

| Starting Material/Sample Number | P11 | P12 | P113 | P14 | P15 | P16 | P17 | P18 | P19 | P20 |
|---|---|---|---|---|---|---|---|---|---|---|
| C1 | 0.097 | 0.221 | 0.575 | 1.009 | 1.111 | 1.875 | 0.272 | 0.391 | 0.619 | 1.039 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 1.00 | 1.00 | 1.00 | 1.00 | 1.00 | 1.00 | 1.00 | 1.00 | 1.00 | 1.00 |

TABLE 3

Composition of Samples P21 to P30

| Starting Material/Sample Number | P21 | P22 | P23 | P24 | P25 | P26 | P27 | P28 | P29 | P30 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C1 | 0.146 | 0.331 | 0.863 | 1.514 | 1.667 | 2.813 | 0.408 | 0.586 | 0.929 | 1.559 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 1.50 | 1.50 | 1.50 | 1.50 | 1.50 | 1.50 | 1.50 | 1.50 | 1.50 | 1.50 |

TABLE 4

Composition of Samples P31 to P40

| Starting Material/Sample Number | P31 | P32 | P33 | P34 | P35 | P36 | P37 | P38 | P39 | P40 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C1 | 0.194 | 0.442 | 1.151 | 2.019 | 2.222 | 3.750 | 0.544 | 0.781 | 1.239 | 2.079 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 2.0 | 2.0 | 2.0 | 2.0 | 2.0 | 2.0 | 2.0 | 2.0 | 2.0 | 2.0 |

TABLE 6

Composition of Samples P51 to P60

| Starting Material/Sample Number | P51 | P52 | P53 | P54 | P55 | P56 | P57 | P58 | P59 | P60 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C2 | 0.144 | 0.327 | 0.853 | 1.495 | 1.646 | 2.778 | 0.403 | 0.579 | 0.918 | 1.540 |
| E1 | 0.15 | 0.15 | 0.15 | 0.15 | 0.15 | 0.15 | 0.15 | 0.15 | 0.15 | 0.15 |
| F1 | 1.5 | 1.5 | 1.5 | 1.5 | 1.5 | 1.5 | 1.5 | 1.5 | 1.5 | 1.5 |
| SiH/Vi Ratio | 1.0 | 1.0 | 1.0 | 1.0 | 1.0 | 1.0 | 1.0 | 1.0 | 1.0 | 1.0 |

TABLE 7

Composition of Samples P61 to P70

| Starting Material/Sample Number | P61 | P62 | P63 | P64 | P65 | P66 | P67 | P68 | P69 | P70 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C2 | 0.216 | 0.491 | 1.279 | 2.243 | 2.469 | 4.167 | 0.604 | 0.868 | 1.377 | 2.310 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 1.50 | 1.50 | 1.50 | 1.50 | 1.50 | 1.50 | 1.50 | 1.50 | 1.50 | 1.50 |

TABLE 8

Compositions of Samples P71 to P80

| Starting Material/Sample Number | P71 | P72 | P73 | P74 | P75 | P76 | P77 | P78 | P79 | P80 |
|---|---|---|---|---|---|---|---|---|---|---|
| A1 | 400.00 | 0 | 0 | 0 | 0 | 0 | 0 | 0 | 0 | 0 |
| A2 | 0 | 400.00 | 0 | 0 | 0 | 0 | 0 | 0 | 0 | 0 |
| A3 | 0 | 0 | 400.00 | 0 | 0 | 0 | 0 | 0 | 0 | 0 |
| A4 | 0 | 0 | 0 | 400.00 | 0 | 0 | 0 | 0 | 0 | 0 |
| A5 | 0 | 0 | 0 | 0 | 400.00 | 0 | 0 | 0 | 0 | 0 |
| A6 | 0 | 0 | 0 | 0 | 0 | 400.00 | 0 | 0 | 0 | 0 |
| A7 | 0 | 0 | 0 | 0 | 0 | 0 | 100.00 | 0 | 0 | 0 |
| A8 | 0 | 0 | 0 | 0 | 0 | 0 | 0 | 100.00 | 0 | 0 |
| A9 | 0 | 0 | 0 | 0 | 0 | 0 | 0 | 0 | 100.00 | 0 |
| A10 | 0 | 0 | 0 | 0 | 0 | 0 | 0 | 0 | 0 | 100.00 |
| C2 | 0.288 | 0.654 | 1.705 | 2.990 | 3.292 | 5.556 | 0.805 | 1.158 | 1.835 | 3.080 |
| E1 | 0.15 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 | 1.50 |
| SiH/Vi ratio | 2.00 | 2.00 | 2.00 | 2.00 | 2.00 | 2.00 | 2.00 | 2.00 | 2.00 | 2.00 |

TABLE 9

Composition of Samples P81 to P88

| Starting Material/Sample Number | P81 | P82 | P83 | P84 | P85 | P86 | P87 | P88 |
|---|---|---|---|---|---|---|---|---|
| A4 | 200.00 | 200.00 | 200.00 | 200.00 | 200.00 | 200.00 | 200.00 | 200.00 |
| A9 | 200.00 | 200.00 | 200.00 | 200.00 | 200.00 | 200.00 | 200.00 | 200.00 |
| C1 | 0.72 | 1.44 | 3.20 | 4.27 | 0 | 0 | 0 | 0 |
| C2 | 0 | 0 | 0 | 0 | 1.07 | 2.14 | 3.20 | 4.27 |
| E1 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 |
| SiH/Vi ratio | 0.50 | 1.00 | 1.50 | 2.00 | 0.50 | 1.00 | 1.50 | 2.00 |

TABLE 10

Composition of Samples A01 to A18

| Starting Material/Sample Number | A01 | A02 | A03 | A04 | A05 | A06 | A07 | A08 | A09 |
|---|---|---|---|---|---|---|---|---|---|
| A4 | 400.00 | 400.00 | 400.00 | 0 | 0 | 0 | 400.00 | 400.00 | 400.00 |
| A6 | 0 | 0 | 0 | 400.00 | 400.00 | 400.00 | 0 | 0 | 0 |
| B1 | 5.30 | 11.00 | 17.60 | 5.30 | 11.00 | 17.60 | 0 | 0 | 0 |
| B2 | 0 | 0 | 0 | 0 | 0 | 0 | 5.30 | 11.00 | 17.60 |
| B3 | 0 | 0 | 0 | 0 | 0 | 0 | 0 | 0 | 0 |
| C1 | 1.01 | 1.01 | 1.01 | 1.88 | 1.88 | 1.88 | 1.01 | 1.01 | 1.01 |
| E1 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 |
| SiH/Vi ratio | 1.00 | 1.00 | 1.00 | 1.00 | 1.00 | 1.00 | 1.00 | 1.00 | 1.00 |

TABLE 10-continued

| Starting Material/Sample Number | A10 | A11 | A12 | A13 | A14 | A15 | A16 | A17 | A18 |
|---|---|---|---|---|---|---|---|---|---|
| A4 | 0 | 0 | 0 | 400.00 | 400.00 | 400.00 | 0 | 0 | 0 |
| A6 | 400.00 | 400.00 | 400.00 | 0 | 0 | 0 | 400.00 | 400.00 | 400.00 |
| B1 | 0 | 0 | 0 | 0 | 0 | 0 | 0 | 0 | 0 |
| B2 | 5.30 | 11.00 | 17.60 | 0 | 0 | 0 | 0 | 0 | 0 |
| B3 | 0 | 0 | 0 | 5.30 | 11.00 | 17.60 | 5.30 | 11.00 | 17.60 |
| C1 | 1.88 | 1.88 | 1.88 | 1.01 | 1.01 | 1.01 | 1.88 | 1.88 | 1.88 |
| E1 | 0.15 | 0.15 | 0.15 | 0.15 | 0.15 | 0.15 | 0.15 | 0.15 | 0.15 |
| F1 | 1.50 | 1.50 | 1.50 | 1.50 | 1.50 | 1.50 | 1.50 | 1.50 | 1.50 |
| SiH/Vi ratio | 1.00 | 1.00 | 1.00 | 1.00 | 1.00 | 1.00 | 1.00 | 1.00 | 1.00 |

TABLE 11

Initial Adhesion, Adhesion after Aging and Residual Results

| Sample Number | Vi % | SiH/Vi | Example 12 Initial | Example 13 24 hr | Example 13 72 hr | Example 13 calculated rate | Example 14 24 hr | Example 14 72 hr |
|---|---|---|---|---|---|---|---|---|
| P6 | 0.78 | 0.5 | 0.7 | 2.8 | 3.5 | 5.0 | 274.0 | 288.0 |
| P5 | 0.45 | 0.5 | 0.9 | 4.6 | 5.1 | 5.7 | 271.8 | 269.3 |
| P10 | 0.42 | 0.5 | 1.8 | 2.3 | 5.9 | 3.3 | 203.9 | 205.8 |
| P4 | 0.41 | 0.5 | 0.6 | 4.0 | 4.0 | 6.7 | 288.0 | 292.0 |
| P81 | 0.32 | 0.5 | 2.0 | 12.4 | 13.0 | 6.5 | 241.9 | 208.9 |
| P9 | 0.24 | 0.5 | 6.0 | 7.0 | 25.4 | 4.2 | 189.0 | 185.4 |
| P3 | 0.22 | 0.5 | 2.2 | 27.1 | 29.8 | 13.5 | 92.6 | 528.0 |
| P8 | 0.14 | 0.5 | 12.6 | 19.4 | 43.9 | N/A | 3.7 | 5.1 |
| P7 | 0.09 | 0.5 | 54.4 | 70.2 | 88.8 | N/A | 4.8 | 11.2 |
| P2 | 0.07 | 0.5 | 34.7 | 1318.0 | 1368.0 | N/A | 13.3 | 5.5 |
| P1 | 0.01 | 0.5 | 4.1 | 8.4 | 8.4 | N/A | 1.2 | 1.1 |
| P16 | 0.78 | 1.0 | 0.9 | 2.7 | 3.2 | 3.6 | 309.0 | 346.0 |
| P15 | 0.45 | 1.0 | 1.0 | 9.4 | 4.5 | 4.5 | 214.0 | 217.0 |
| P20 | 0.42 | 1.0 | 1.4 | 3.7 | 6.0 | 4.3 | 229.1 | 225.6 |
| P14 | 0.41 | 1.0 | 0.5 | 2.9 | 3.2 | 6.4 | 316.0 | 298.0 |
| P82 | 0.32 | 1.0 | 1.3 | 5.6 | 6.4 | 5.1 | 191.6 | 202.1 |
| P19 | 0.24 | 1.0 | 3.3 | 17.2 | 17.9 | 5.4 | 111.3 | 127.6 |
| P13 | 0.22 | 1.0 | 0.6 | 5.9 | 8.5 | 14.2 | 281.0 | 200.0 |
| P18 | 0.14 | 1.0 | 5.5 | 46.7 | 86.1 | N/A | 13.0 | 18.7 |
| P17 | 0.09 | 1.0 | 16.5 | 152.0 | 230.0 | N/A | 10.2 | 17.8 |
| P12 | 0.07 | 1.0 | 34.2 | 92.0 | 142.0 | N/A | 91.6 | 53.0 |
| P11 | 0.01 | 1.0 | 287.0 | 282.0 | 304.0 | N/A | 2.3 | 5.9 |
| P26 | 0.78 | 1.5 | 1.1 | 4.3 | 4.8 | 4.4 | 206.0 | 291.0 |
| P25 | 0.45 | 1.5 | 1.0 | 4.7 | 5.8 | 5.8 | 227.9 | 225.8 |
| P30 | 0.42 | 1.5 | 0.9 | 6.9 | 6.7 | 7.4 | 233.0 | 201.0 |
| P24 | 0.41 | 1.5 | 0.6 | 3.0 | 2.1 | 3.5 | 305.0 | 343.0 |
| P83 | 0.32 | 1.5 | 0.9 | 3.4 | 3.7 | 4.1 | 226.7 | 269.2 |
| P29 | 0.24 | 1.5 | 1.6 | 13.7 | 12.2 | 7.6 | 166.5 | 183.0 |
| P23 | 0.22 | 1.5 | 1.0 | 5.8 | 5.0 | 5.0 | 194.0 | 270.0 |
| P28 | 0.14 | 1.5 | 3.8 | 36.6 | 33.8 | 8.9 | 79.4 | 77.6 |
| P27 | 0.09 | 1.5 | 10.6 | 400.0 | 570.0 | N/A | 8.8 | 24.4 |
| P22 | 0.07 | 1.5 | 12.4 | 124.3 | 142.6 | N/A | 39.0 | 20.0 |
| P21 | 0.01 | 1.5 | 40.6 | 913.0 | 878.0 | N/A | 4.0 | 6.7 |
| P36 | 0.78 | 2.0 | 1.3 | 2.4 | 6.0 | 4.6 | 235.0 | 219.5 |
| P35 | 0.45 | 2.0 | 1.6 | 8.6 | 10.1 | 6.3 | 254.9 | 220.0 |
| P40 | 0.42 | 2.0 | 0.7 | 5.0 | 5.3 | 7.6 | 199.0 | 239.0 |
| P34 | 0.41 | 2.0 | 0.6 | 1.3 | 3.2 | 5.3 | 324.0 | 290.0 |
| P84 | 0.32 | 2.0 | 0.9 | 3.2 | 3.4 | 4.0 | 239.8 | 209.6 |
| P39 | 0.24 | 2.0 | 0.8 | 10.3 | 10.9 | 13.6 | 118.0 | 106.5 |
| P33 | 0.22 | 2.0 | 0.8 | 9.2 | 7.2 | 9.0 | 99.8 | 132.0 |
| P38 | 0.14 | 2.0 | 0.8 | 13.9 | 28.9 | 36.1 | 155.0 | 54.3 |
| P37 | 0.09 | 2.0 | 1.2 | 25.6 | 68.9 | 57.4 | 11.0 | 28.5 |
| P32 | 0.07 | 2.0 | 2.0 | 22.5 | 23.9 | 12.0 | 55.0 | 31.6 |
| P31 | 0.01 | 2.0 | 19.7 | 1678.0 | 1897.0 | N/A | 15.1 | 3.7 |
| P46 | 0.78 | 0.5 | 0.5 | 1.4 | 2.4 | 4.8 | 274.0 | 224.8 |
| P45 | 0.45 | 0.5 | 0.8 | 4.6 | 4.6 | 5.8 | 237.0 | 221.5 |
| P50 | 0.42 | 0.5 | 1.0 | 2.9 | 6.1 | 6.1 | 200.2 | 209.3 |
| P44 | 0.41 | 0.5 | 0.7 | 3.9 | 5.6 | 8.0 | 228.0 | 219.3 |
| P85 | 0.32 | 0.5 | 1.3 | 7.9 | 8.9 | 7.1 | 223.9 | 285.3 |
| P49 | 0.24 | 0.5 | 3.7 | 8.9 | 21.9 | 5.9 | 198.1 | 195.0 |
| P43 | 0.22 | 0.5 | 0.8 | 9.9 | 10.5 | 13.1 | 139.0 | 126.2 |
| P48 | 0.14 | 0.5 | 15.1 | 32.1 | 26.6 | N/A | 4.2 | 5.4 |
| P47 | 0.09 | 0.5 | 21.8 | 93.6 | 111.0 | N/A | 5.6 | 4.1 |
| P42 | 0.07 | 0.5 | 1.6 | 69.6 | 165.0 | N/A | 30.0 | 73.8 |
| P41 | 0.01 | 0.5 | 1.4 | 7.6 | 7.8 | N/A | 2.3 | 2.5 |
| P56 | 0.78 | 1.0 | 0.8 | 1.5 | 3.1 | 3.9 | 265.0 | 300.0 |

TABLE 11-continued

Initial Adhesion, Adhesion after Aging and Residual Results

| Sample Number | Vi % | SiH/Vi | Example 12 Initial | Example 13 24 hr | Example 13 72 hr | Example 13 calculated rate | Example 14 24 hr | Example 14 72 hr |
|---|---|---|---|---|---|---|---|---|
| P55 | 0.45 | 1.0 | 1.0 | 4.5 | 8.9 | 8.9 | 268.6 | 236.8 |
| P60 | 0.42 | 1.0 | 0.9 | 3.9 | 5.0 | 5.6 | 216.9 | 224.8 |
| P54 | 0.41 | 1.0 | 0.6 | 1.9 | 3.2 | 5.3 | 287.0 | 265.4 |
| P86 | 0.32 | 1.0 | 0.9 | 4.3 | 4.6 | 5.1 | 248.6 | 236.3 |
| P59 | 0.24 | 1.0 | 1.5 | 12.4 | 9.9 | 6.6 | 194.1 | 170.0 |
| P53 | 0.22 | 1.0 | 0.9 | 4.4 | 6.5 | 7.2 | 164.0 | 113.2 |
| P58 | 0.14 | 1.0 | 3.9 | 39.0 | 35.0 | N/A | 23.2 | 25.0 |
| P57 | 0.09 | 1.0 | 5.6 | 69.6 | 135.0 | N/A | 13.3 | 15.7 |
| P52 | 0.07 | 1.0 | 1.7 | 14.6 | 124.9 | N/A | 20.0 | 58.0 |
| P51 | 0.01 | 1.0 | 6.3 | 986.0 | 720.0 | N/A | 6.2 | 13.3 |
| P66 | 0.78 | 1.5 | 0.8 | 1.7 | 3.6 | 4.5 | 218.0 | 236.6 |
| P65 | 0.45 | 1.5 | 1.5 | 6.9 | 9.1 | 6.1 | 244.8 | 243.3 |
| P70 | 0.42 | 1.5 | 0.8 | 5.8 | 6.3 | 7.9 | 244.0 | 237.2 |
| P64 | 0.41 | 1.5 | 0.5 | 1.0 | 2.9 | 5.8 | 200.0 | 305.0 |
| P87 | 0.32 | 1.5 | 0.9 | 2.8 | 3.2 | 3.8 | 203.2 | 238.9 |
| P69 | 0.24 | 1.5 | 1.4 | 8.4 | 9.5 | 6.8 | 204.0 | 104.2 |
| P63 | 0.22 | 1.5 | 1.0 | 7.6 | 6.0 | 6.0 | 99.2 | 220.0 |
| P68 | 0.14 | 1.5 | 1.9 | 23.8 | 25.4 | 13.4 | 48.0 | 32.3 |
| P67 | 0.09 | 1.5 | 2.7 | 38.0 | 34.6 | 12.8 | 73.7 | 71.1 |
| P62 | 0.07 | 1.5 | 2.0 | 19.1 | 34.2 | 17.1 | 81.0 | 89.0 |
| P61 | 0.01 | 1.5 | 66.8 | 2158.0 | 1694.0 | N/A | 26.1 | 35.0 |
| P76 | 0.78 | 2.0 | 1.1 | 1.6 | 3.0 | 2.7 | 315.0 | 356.8 |
| P75 | 0.45 | 2.0 | 1.8 | 6.7 | 6.7 | 3.7 | 319.0 | 297.5 |
| P80 | 0.42 | 2.0 | 0.9 | 5.3 | 6.1 | 6.8 | 207.1 | 201.4 |
| P74 | 0.41 | 2.0 | 0.5 | 0.6 | 2.6 | 5.2 | 205.0 | 348.3 |
| P88 | 0.32 | 2.0 | 0.7 | 2.2 | 2.4 | 3.6 | 233.4 | 203.2 |
| P79 | 0.24 | 2.0 | 0.9 | 10.7 | 11.4 | 12.7 | 160.9 | 94.7 |
| P73 | 0.22 | 2.0 | 1.0 | 4.8 | 6.5 | 6.5 | 126.0 | 214.1 |
| P78 | 0.14 | 2.0 | 2.1 | 26.0 | 19.8 | 9.4 | 47.7 | 80.1 |
| P77 | 0.09 | 2.0 | 2.3 | 39.3 | 28.9 | 12.6 | 40.9 | 82.0 |
| P72 | 0.07 | 2.0 | 1.8 | 25.5 | 34.4 | 19.1 | 96.0 | 92.6 |
| P71 | 0.01 | 2.0 | 6.5 | 850.0 | 1195.0 | N/A | 38.9 | 30.0 |
| A04 | 0.78 | 1.0 | 1.8 | 5.7 | 5.8 | 3.3 | 191.0 | 213.0 |
| A01 | 0.406 | 1.0 | 1.2 | 3.1 | 3.8 | 3.3 | 209.5 | 243.0 |
| A05 | 0.78 | 1.0 | 2.3 | 6.1 | 6.5 | 2.9 | 209.0 | 213.0 |
| A02 | 0.406 | 1.0 | 1.5 | 3.3 | 3.4 | 2.3 | 259.0 | 198.0 |
| A06 | 0.78 | 1.0 | 2.8 | 6.4 | 6.8 | 2.4 | 277.0 | 221.5 |
| A03 | 0.406 | 1.0 | 1.7 | 3.5 | 4.6 | 2.7 | 254.5 | 256.5 |
| A10 | 0.78 | 1.0 | 1.5 | 4.0 | 8.2 | 5.4 | 238.0 | 240.0 |
| A07 | 0.406 | 1.0 | 0.8 | 2.7 | 3.2 | 4.0 | 287.5 | 238.0 |
| A11 | 0.78 | 1.0 | 2.2 | 3.5 | 10.6 | 4.9 | 262.0 | 253.0 |
| A08 | 0.406 | 1.0 | 0.9 | 2.3 | 3.1 | 3.4 | 221.5 | 250.0 |
| A12 | 0.78 | 1.0 | 2.8 | 4.0 | 7.3 | 2.6 | 276.0 | 215.5 |
| A09 | 0.406 | 1.0 | 1.1 | 2.8 | 3.4 | 3.1 | 226.0 | 234.5 |
| A16 | 0.78 | 1.0 | 1.7 | 4.3 | 3.7 | 2.2 | 193.0 | 220.5 |
| A13 | 0.406 | 1.0 | 0.8 | 2.3 | 3.2 | 4.0 | 210.0 | 219.0 |
| A17 | 0.78 | 1.0 | 2.0 | 4.3 | 4.1 | 2.1 | 201.0 | 232.5 |
| A14 | 0.406 | 1.0 | 1.1 | 2.7 | 3.8 | 3.5 | 295.5 | 280.5 |
| A18 | 0.78 | 1.0 | 2.7 | 4.7 | 4.6 | 1.7 | 296.0 | 317.0 |
| A15 | 0.406 | 1.0 | 1.5 | 2.9 | 4.0 | 2.7 | 281.0 | 316.0 |

'N/A' in the table above means "not applicable" because the sample was not tested.

INDUSTRIAL APPLICABILITY

The pressure sensitive adhesive composition described herein cures to form a pressure sensitive adhesive suitable for use in flexible OLED device fabrication processes. The examples above show that the pressure sensitive adhesive prepared by curing the pressure sensitive adhesive composition described above may have initial adhesion of 0.1 to 5 gf/inch on stainless steel (SUS) (as tested according to Example 12); adhesion that does not increase more than 8 times on SUS after aging for 72 hours (see calculation in Example 13), and >100 gf/inch residual adhesion on SUS after 72 hours (as tested according to Example 14). SUS represents an industry standard to develop and test pressure sensitive adhesives. Therefore, without wishing to be bound by theory, it is thought that adhesion properties on SUS will provide comparable results on substrates used in OLED fabrication processes, such as passivation layers, and it is expected that this combination of properties allows a pressure sensitive adhesive film to be used as a protective film on a passivation layer during fabrication of a flexible OLED device.

Usage of Terms

All amounts, ratios, and percentages are by weight unless otherwise indicated by the context of the specification. The articles 'a', 'an', and 'the' each refer to one or more, unless otherwise indicated by the context of the specification. The disclosure of ranges includes the range itself and also anything subsumed therein, as well as endpoints. For example, disclosure of a range of >0.3 to 0.8 includes not only the range of >0.3 to 0.8, but also 0.4, 0.55, 0.6, 0.7, 0.78, and 0.8 individually, as well as any other number subsumed in the range. Furthermore, disclosure of a range of, for example, >0.3 to 0.8 includes the subsets of, for example, 0.4 to 0.6, 0.35 to 0.78, 0.41 to 0.75, 0.78 to 0.8, 0.32 to 0.41, 0.35 to 0.5 as well as any other subset subsumed in the range. Similarly, the disclosure of Markush groups includes the entire group and also any individual members and subgroups subsumed therein. For example, disclosure of the Markush group a vinyl, allyl or hexenyl includes the member vinyl individually; the subgroup vinyl and hexenyl; and any other individual member and subgroup subsumed therein.

Abbreviations used herein have the following meanings: '° C.' means degrees Celsius; 'DP' means degree of polymerization; 'ETCH' means ethynyl cyclohexanol; 'GCMS' means gas chromatography mass spectrometry; 'gf' means grams force; 'hr' means hours; 'KG' or 'kg' means kilograms; 'kgf' means kilograms force; 'min' means minutes; 'OLED' means organic light emitting diode; and 'um' means micrometer.

EMBODIMENTS OF THE INVENTION

In a first embodiment of the invention, a pressure sensitive adhesive comprises a reaction product of starting materials comprising:
A) 85 to 100 parts by weight of an alkenyl containing polydialkylsiloxane, where the alkenyl containing polydialkylsiloxane has silicon bonded alkyl groups with 1 to 10 carbon atoms and silicon bonded alkenyl groups with 2 to 6 carbon atoms,
C) 0.1 to 5 parts by weight of a polyalkylhydrogensiloxane having silicon bonded alkyl groups with 1 to 10 carbon atoms and having, per molecule, an average of at least 1% silicon bonded hydrogen atoms,
F) an amount of a platinum group metal catalyst sufficient to provide 10 to 5000 ppm concentration of Pt group metal in the composition, and
E) 0.01 to 0.5 part by weight of an acetylenic alcohol; with the proviso that the pressure sensitive adhesive has initial adhesion of 0.1 to 5 gf/inch on stainless steel (SUS) as measured according to Example 12; adhesion does not increase more than 8 times on SUS after aging for 72 hours according to the calculation in Example 13, and >100 gf/inch residual adhesion on SUS as measured according to Example 14.

In a second embodiment, the starting materials of the first embodiment further comprises: starting material B) up to 15 parts by weight of a polyalkylsiloxane resin comprising units of formula $(R^1_2R^2SiO_{1/2})_a(R^1_3SiO_{1/2})_b(SiO_{4/2})_c$, where each $R^1$ is independently an alkyl group of 1 to 10 carbon atoms; each $R^2$ is independently selected from $R^1$, OH, and alkenyl groups of 2 to 6 carbon atoms; subscript a≥0, subscript b≥0, subscript c>0, a quantity (a+b)>0, and subscripts a, b, and c have values such that 0.9≤(a+b)/c≤1.3.

In a third embodiment, the starting materials of the first or second embodiment further comprises: D) 0.1 to 5.0 part by weight of an adhesion promoter.

In a fourth embodiment, starting material A) the alkenyl containing polydialkylsiloxane has >0.3% to 0.8% alkenyl groups in any one of the preceding embodiments.

In a fifth embodiment, starting material A) the alkenyl containing polydialkylsiloxane comprises unit formula: $(R^1_2R^2SiO_{1/2})_d(R^1_3SiO_{1/2})_e(R^1R^2SiO_{2/2})_f(R^1_2SiO_{2/2})_g$, where subscript d≥0, subscript e≥0, subscript f>0, subscript g≥0, where a quantity (d+e) has an average value of 2 in any one of the preceding embodiments.

In a sixth embodiment, the pressure sensitive adhesive is free of free of silicon bonded aromatic hydrocarbyl groups.

In a seventh embodiment, a pressure sensitive adhesive composition is prepared in multiple parts wherein F) the platinum group metal catalyst is stored in a separate part from all SiH containing starting materials.

In an eighth embodiment, a method comprises:
1) applying to a substrate, a pressure sensitive adhesive composition comprising
A) 85 to 100 parts by weight of an alkenyl containing polydialkylsiloxane, where the alkenyl containing polydialkylsiloxane has silicon bonded alkyl groups with 1 to 10 carbon atoms and silicon bonded alkenyl groups with 2 to 6 carbon atoms, and where the alkenyl groups are present in an amount >0.3% based on the weight of the alkenyl containing polydialkylsiloxane,
C) 0.1 to 5 parts by weight of a polyalkylhydrogensiloxane having silicon bonded alkyl groups with 1 to 10 carbon atoms and having, per molecule, an average of at least 1% silicon bonded hydrogen atoms,
F) an amount of a platinum group metal catalyst sufficient to provide 10 to 5000 ppm concentration of Pt group metal in the composition, and
E) 0.01 to 0.5 part by weight of an acetylenic alcohol, and
G) 10% to 90% based on combined weights of all starting materials in the composition of an organic solvent; with the proviso that all starting materials in the composition combined have a molar ratio of silicon bonded hydrogen atoms/silicon bonded alkenyl groups (SiH/Alkenyl ratio) of 0.5 to 2, and
optionally 2) removing all or a portion of the organic solvent; and
3) curing the pressure sensitive adhesive composition, thereby forming a pressure sensitive adhesive, wherein the pressure sensitive adhesive has an initial adhesion of 0.1 to 5 gf/inch on stainless steel (SUS) as measured according to Example 12; adhesion does not increase more than 8 times on SUS after aging for 72 hours according to the calculation in Example 13, and >100 gf/inch residual adhesion on SUS as measured by Example 14.

In a ninth embodiment, starting material A) is free of silicon bonded aromatic hydrocarbyl groups, starting material C) is free of silicon bonded aromatic hydrocarbyl groups, or both.

In a tenth embodiment, the pressure sensitive adhesive composition further comprises starting material B) up to 15 parts by weight of a polyalkylsiloxane resin comprising units of formula $(R^1_2R^2SiO_{1/2})_a(R^1_3SiO_{1/2})_b(SiO_{4/2})_c$, where each $R^1$ is independently an alkyl group of 1 to 10 carbon atoms; each $R^2$ is independently selected from $R^1$, OH, and alkenyl groups of 2 to 6 carbon atoms; subscript a≥0, subscript b≥0, subscript c>0, a quantity (a+b)>0, and subscripts a, b, and c have values such that 0.9≤(a+b)/c≤1.3; starting material D) 0.1 to 5.0 part by weight of an adhesion promoter; or both.

In an eleventh embodiment, starting material B) and starting material D) are free of silicon bonded aromatic hydrocarbyl groups.

In a twelfth embodiment, the SiH/Alkenyl ratio is 1 to 2 in the seventh embodiment. In a thirteenth embodiment, the SiH/Alkenyl ratio is >1 to 2 in the twelfth embodiment.

In a fourteenth embodiment, the SiH/Alkenyl ratio is >1 to 1.2 in the thirteenth embodiment.

In a fifteenth embodiment, the alkenyl content of starting material A) is >0.3% to 0.8% in any of the preceding embodiments.

In a sixteenth embodiment, the alkenyl content of starting material A) is 0.32% to 0.78% in any of the preceding embodiments.

In a seventeenth embodiment, a method for fabricating a flexible organic light emitting diode device, comprises: applying the pressure sensitive adhesive film prepared by the method of the eighth embodiment to a passivation layer in the device.

In an eighteenth embodiment, the pressure sensitive adhesive film of the prepared by the method of the eighth embodiment is used as a protective film a flexible OLED fabrication process.

In a nineteenth embodiment, a pressure sensitive adhesive composition comprises:

A) 85 to 100 parts by weight of an alkenyl containing polydialkylsiloxane, where the alkenyl containing polydialkylsiloxane has silicon bonded alkyl groups with 1 to 10 carbon atoms and silicon bonded alkenyl groups with 2 to 6 carbon atoms, and where the alkenyl groups are present in an amount >0.3% based on the weight of the alkenyl containing polydialkylsiloxane, optionally B) up to 15 parts by weight of a polyalkylsiloxane resin comprising units of formula $(R^1{}_2R^2SiO_{1/2})_a$ $(R^1{}_3SiO_{1/2})_b(SiO_{4/2})_c$, where each $R^1$ is independently an alkyl group of 1 to 10 carbon atoms; each $R^2$ is independently selected from $R^1$, OH, and alkenyl groups of 2 to 6 carbon atoms; subscript a≥0, subscript b≥0, subscript c>0, a quantity (a+b)>0, and subscripts a, b, and c have values such that 0.9≤(a+b)/c≤1.3, C) 0.1 to 5 parts by weight of a polyalkylhydrogensiloxane having silicon bonded alkyl groups with 1 to 10 carbon atoms and having, per molecule, an average of at least 1% silicon bonded hydrogen atoms, optionally D) 0.1 to 5.0 part by weight an adhesion promoter, F) an amount of a platinum group metal catalyst sufficient to provide 10 to 5000 ppm concentration of Pt group metal in the composition, and E) 0.01 to 0.5 part by weight of an acetylenic alcohol, and G) 10% to 90% based on combined weights of all starting materials in the composition of an organic solvent; with the proviso that all starting materials in the composition combined have a molar ratio of silicon bonded hydrogen atoms/silicon bonded alkenyl groups (SiH/Alkenyl ratio) of 0.5 to 2.

In a twentieth embodiment, starting material A) is free of silicon bonded aromatic hydrocarbyl groups, starting material B), when present, is free of silicon bonded aromatic hydrocarbyl groups, starting material C) is free of silicon bonded aromatic hydrocarbyl groups, starting material D), when present, is free of silicon bonded aromatic hydrocarbyl groups or two or more thereof in the nineteenth embodiment.

The invention claimed is:

1. A method for fabricating a flexible organic light emitting diode device, where the method comprises:
   1) applying a pressure sensitive adhesive composition to a substrate,
   2) curing the pressure sensitive adhesive composition to form a pressure sensitive adhesive film, and
   3) applying the pressure sensitive adhesive film to a passivation layer in the device;

wherein the pressure sensitive adhesive composition comprises:
   85 to 100 parts by weight of starting material A) an alkenyl containing polydialkylsiloxane comprising unit formula $(R^1{}_2R^2SiO_{1/2})_d(R^1{}_3SiO_{1/2})_e(R^1R^2SiO_{2/2})_f(R^1{}_2SiO_{2/2})_g$, where each $R^1$ is independently an alkyl group of 1 to 10 carbon atoms and each $R^2$ is independently an alkenyl group of 2 to 6 carbon atoms, subscript d≥0, subscript e≥0, subscript f>0, subscript g≥0, where a quantity (d+e) has an average value of 2, and where the alkenyl groups are present in an amount >0.3-0.8 weight % based on the weight of the alkenyl containing polydialkylsiloxane,
   0.1 to 5 parts by weight of starting material C) a polyalkylhydrogensiloxane having silicon bonded alkyl groups with 1 to 10 carbon atoms and having, per molecule, an average of at least 1% silicon bonded hydrogen atoms,
   an amount of starting material F) a platinum group metal catalyst sufficient to provide 10 to 5000 ppm concentration of platinum group metal in the composition, and
   0.01 to 0.5 part by weight of starting material E) an acetylenic alcohol, and
   10% to 90% based on combined weights of all starting materials in the composition of starting material G) an organic solvent; with the proviso that all starting materials in the composition combined have a molar ratio of silicon bonded hydrogen atoms/silicon bonded alkenyl groups (SiH/Alkenyl ratio) of 0.5 to 2.

2. The method of claim 1, where the pressure sensitive adhesive composition further comprises: up to 15 parts by weight of starting material B) a polyalkylsiloxane resin comprising units of formula $(R^1{}_2R^3SiO_{1/2})_a(R^1{}_3SiO_{1/2})_b(SiO_{4/2})_c$, where each $R^1$ is independently an alkyl group of 1 to 10 carbon atoms; each $R^2$ is independently selected from $R^1$, OH, and alkenyl groups of 2 to 6 carbon atoms; subscript a≥0, subscript b≥0, subscript c>0, a quantity (a+b)>0, and subscripts a, b, and c have values such that 0.9≤(a+b)/c≤1.3.

3. The method of claim 1, where the pressure sensitive adhesive composition further comprises: 0.1 to 5.0 part by weight of starting material D) an adhesion promoter.

4. The method of claim 1, where starting material A) the alkenyl containing polydialkylsiloxane has 0.405 to 0.78 weight % alkenyl groups.

5. The method of claim 1, where the pressure sensitive adhesive composition is a multiple part composition comprising a base part and a curing agent part, where the base part comprises starting materials A) the alkenyl containing polydialkylsiloxane, C) the polyalkylhydrogensiloxane, and G) the organic solvent; and the curing agent part comprises starting materials A) the alkenyl containing polydialkylsiloxane, F) the platinum group metal catalyst and G) the organic solvent; and the composition further comprises starting material E) the acetylenic alcohol in one or more of the base part or a separate third part.

* * * * *